US 7,418,668 B2

(12) United States Patent
Lindsay et al.

(10) Patent No.: US 7,418,668 B2
(45) Date of Patent: Aug. 26, 2008

(54) GLASS APPEARANCE WINDOW FRAME COLORIZATION

(75) Inventors: Donald J. Lindsay, Mountain View, CA (US); Tjeerd Hoek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/289,514

(22) Filed: Nov. 30, 2005

(65) Prior Publication Data

US 2007/0124692 A1 May 31, 2007

(51) Int. Cl.
*G06F 3/00* (2006.01)
(52) U.S. Cl. .................. 715/781; 715/765; 715/768; 715/782
(58) Field of Classification Search .................. 715/765
See application file for complete search history.

(56) References Cited

U.S. PATENT DOCUMENTS

| 5,452,406 | A | * | 9/1995 | Butler et al. ................. 345/426 |
| 5,742,749 | A | * | 4/1998 | Foran et al. ................. 345/426 |
| 5,917,487 | A | * | 6/1999 | Ulrich ........................ 715/765 |
| 5,920,313 | A | * | 7/1999 | Diedrichsen et al. ........ 715/767 |
| 6,104,391 | A | | 8/2000 | Johnston, Jr. et al. |
| 6,356,284 | B1 | | 3/2002 | Manduley et al. |
| 6,445,400 | B1 | * | 9/2002 | Maddalozzo et al. ........ 715/803 |
| 6,466,228 | B1 | | 10/2002 | Ulrich et al. |
| 6,633,310 | B1 | | 10/2003 | Andrew et al. |
| 6,918,093 | B2 | | 7/2005 | Broussard |

| 2002/0149629 | A1 | | 10/2002 | Craycroft et al. |
| 2003/0058278 | A1 | * | 3/2003 | Allen et al. ................. 345/765 |
| 2003/0231204 | A1 | | 12/2003 | Hanggie et al. |

(Continued)

FOREIGN PATENT DOCUMENTS

EP 1143334 A2 10/2001

(Continued)

OTHER PUBLICATIONS

Welch, John, (Builder.com), "VB tips: Making Windows transparent in 2K and XP," Dec. 31, 2002, printed from http://www.builderau.com.au/program/windows/print.htm?TYPE=story&AT=20270917-3 (printed on Sep. 14, 2005) 4 pages.

(Continued)

*Primary Examiner*—David Wiley
*Assistant Examiner*—Anil N Kumar
(74) *Attorney, Agent, or Firm*—Shook, Hardy & Bacon L.L.P.

(57) ABSTRACT

A method for changing a color value and/or level of opacity value of a glass appearance window frame for an application window is described. The method includes steps of determining a defined color value and a defined level of opacity value to apply to a glass appearance window frame and displaying the glass appearance window frame in accordance with the defined color value and the defined level of opacity value. A command may be received to apply the defined color value and the defined level of opacity value to the glass appearance window frame, thereby applying the defined color value and level of opacity value to the glass appearance window frame. Color values and/or level of opacity values may be changed automatically, be application specific, and/or be changed in response to receipt of an input from a user to change one or more portions of a default configuration.

17 Claims, 14 Drawing Sheets

U.S. PATENT DOCUMENTS

| | | | |
|---|---|---|---|
| 2004/0162675 A1* | 8/2004 | Moon et al. ................... | 702/3 |
| 2004/0207658 A1 | 10/2004 | Awada et al. | |
| 2004/0230888 A1 | 11/2004 | Kramer et al. | |
| 2005/0044504 A1 | 2/2005 | Fernandez et al. | |
| 2005/0060658 A1* | 3/2005 | Tsukiori ................... | 715/765 |
| 2005/0073529 A1 | 4/2005 | Gu | |
| 2005/0088447 A1* | 4/2005 | Hanggie et al. ............ | 345/545 |
| 2005/0091608 A1* | 4/2005 | Gusmorino et al. ......... | 715/801 |

FOREIGN PATENT DOCUMENTS

| | | | |
|---|---|---|---|
| EP | 1156416 A2 | 11/2001 | |

OTHER PUBLICATIONS

Ragsdale, Kevin "Try Blogging Catch to IoException Endtry," printed from http://weblogs.foxite.com/kevinragsdale/archive/2005/03/24/254.aspx (printed on Sep. 14, 2005), 3 pages.

"Create Translucent Forms, Animate How Forms Open and Close, Tile an Image Across a Form's Background," (TheScarms Visual Basic Code Library), printed from http://www.thescarms.com/vbasic/tileimage.asp (printed Sep. 14, 2005) 3 pages.

* cited by examiner

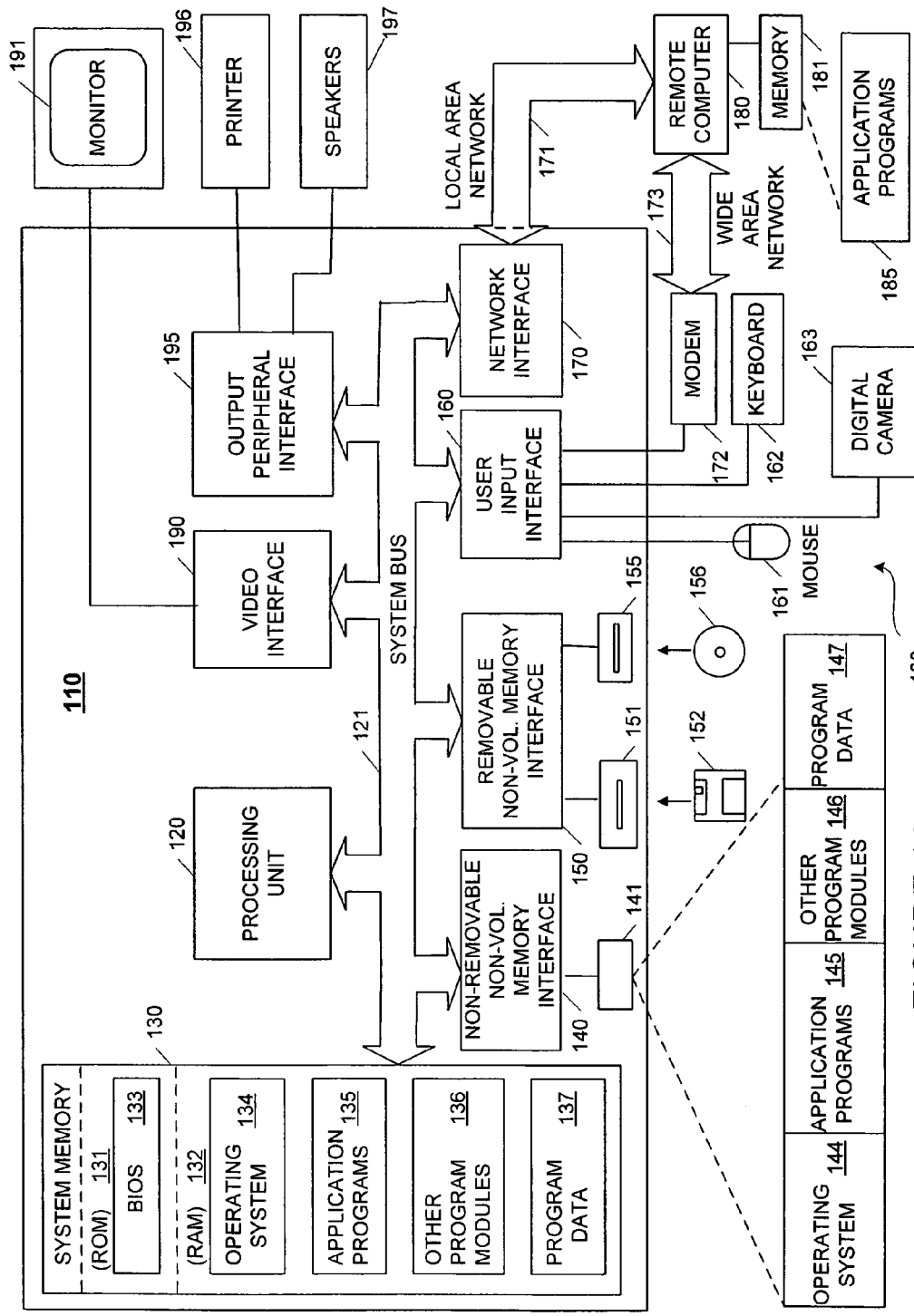

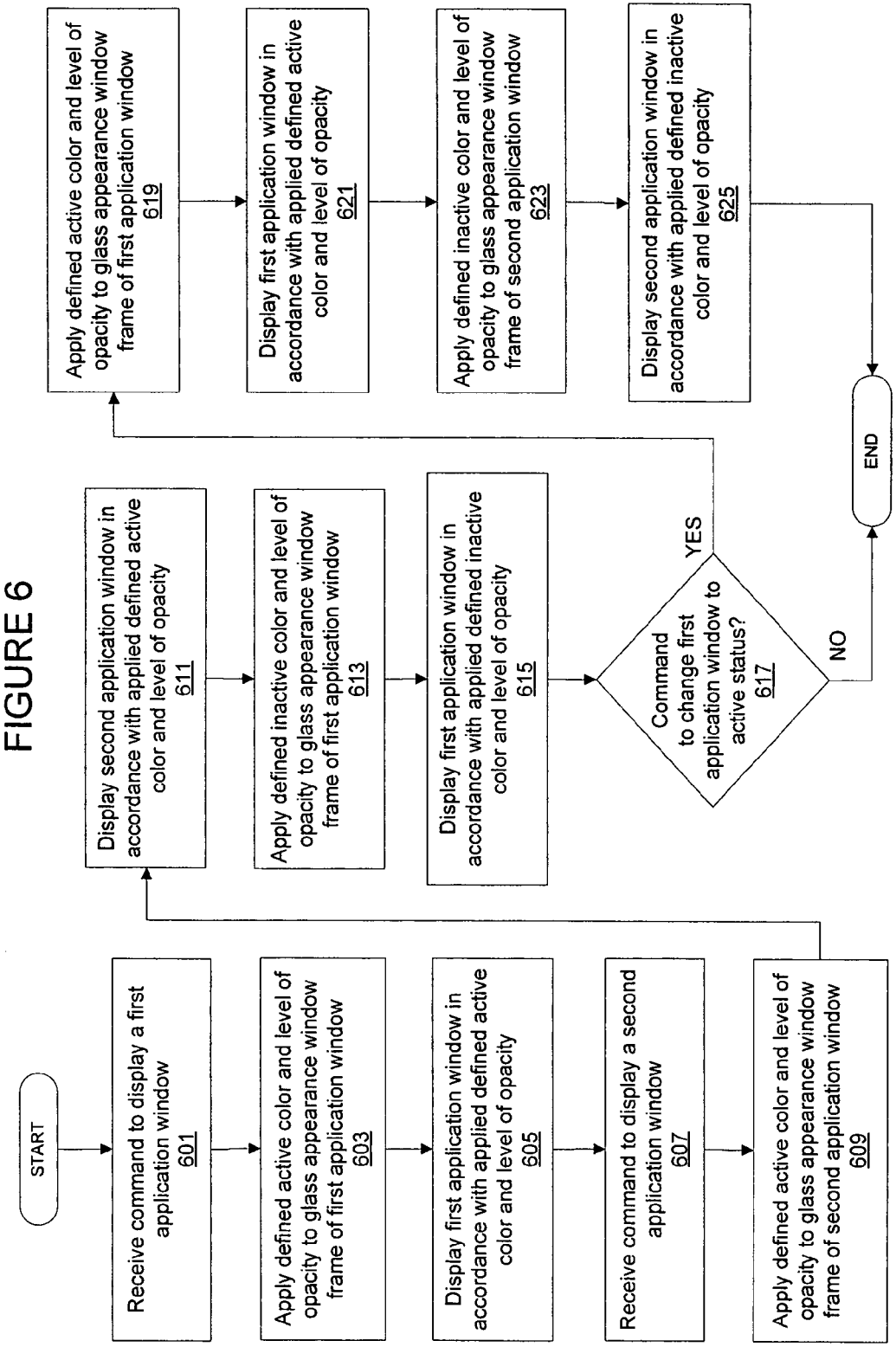

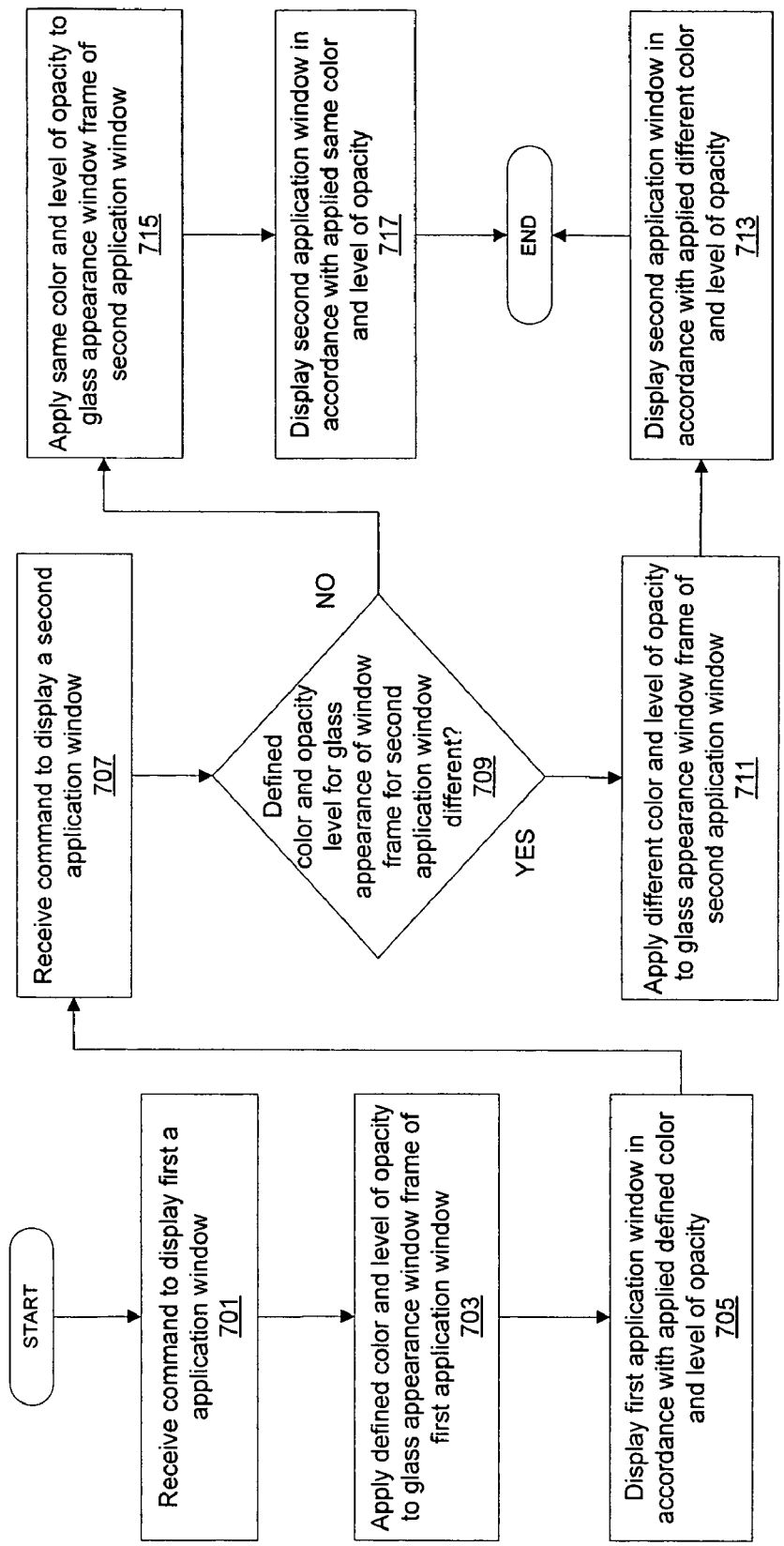

GLASS APPEARANCE WINDOW FRAME COLORIZATION

BACKGROUND

Today, many operating systems utilize a windows based configuration of user interface elements, such as application programs. Application windows are a user interface facility of graphical user interface (GUI) systems. While application windows may vary in appearance across systems, they share many common user interface (UI) visuals attributes, such as a frame area with a title bar control containing window management controls, the ability to be resized and repositioned, and to exist among other application windows associated with different applications. Together, multiple application windows can appear simultaneously on the screen, even layered on top of each other, typically represented by the order each application window was last accessed by a user. When an application window is the window that a user is working with currently, its frame appears in an active visual state. This is in contrast to an inactive visual state when the application window is not the window the user is currently working with. These two states typically have different appearances and primarily serve to communicate to the user which application window she is currently working with.

Windows® XP by Microsoft® Corporation of Redmond, Wash. supports the ability to change user interface "themes" which essentially swaps out all UI visuals with alternate renderings in an operating environment. The themes of Windows® XP are different bitmaps. As a user chose a different theme for her desktop environment, UI elements of the environment would employ the designated bitmaps for the different UI elements. Windows® XP provides the ability to change the appearance of all common window frames and controls and other UI elements, allowing for personalization of the operating environment. However, a user is limited to the themes provided.

Other operating systems employ a UI environment which is drawn programmatically. Users are provided greater flexibility in personalization as color choice is not limited to supplied bitmaps. Users can effectively dial in any color choice they wished and have that applied to common window frame and controls and other UI elements. However, the color choice is a single format applied to a single non-glass appearance window frame representation. A user is not supplied with a number of different visual appearances for the UI elements other than the overall color choice.

SUMMARY

Increasing a user experience in an operating environment and additional manners for identification of application windows, property sheets, and dialogs for the user are always under development. Creating real world environments during a user experience facilitates an easier understanding of use of an application window and other user interface elements displayed as part of an operating system. Aspects of the invention include a system for rendering colorization to a glass appearance window frame. Aspects are directed to methods for displaying and/or changing a glass appearance window frame's visual appearance in the event of an action and/or based upon user-defined or system defined values.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 1A illustrates a schematic diagram of a general-purpose digital computing environment in which certain aspects of the present invention may be implemented;

FIG. 6 is a flowchart of an illustrative example of a method for displaying application windows with glass appearance window frames based on whether they are in an active or inactive state in accordance with at least one aspect of the present invention;

FIG. 7 is flowchart of an illustrative example of a method for displaying application windows with glass appearance window frames in accordance with at least one aspect of the present invention.

DETAILED DESCRIPTION

Figure 1C:
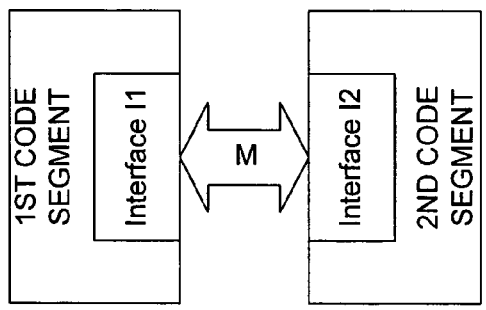
FIG. 1B through 1M show a general-purpose computer environment supporting one or more aspects of the present invention.

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1E:
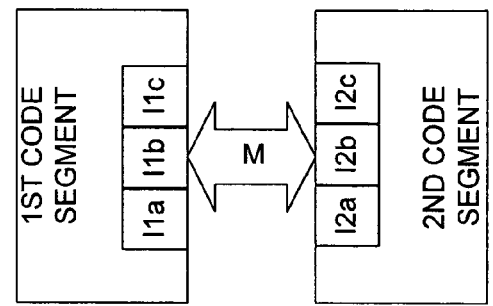
Figure 1B:
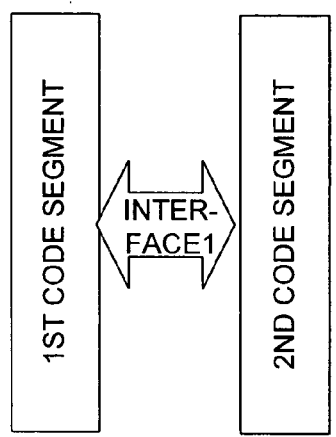

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIG. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
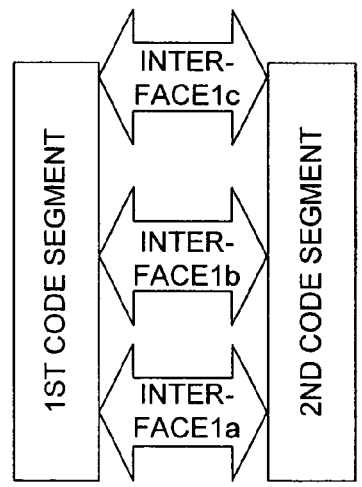

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
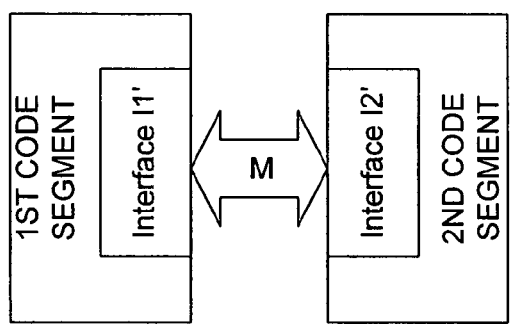
Figure 1G:
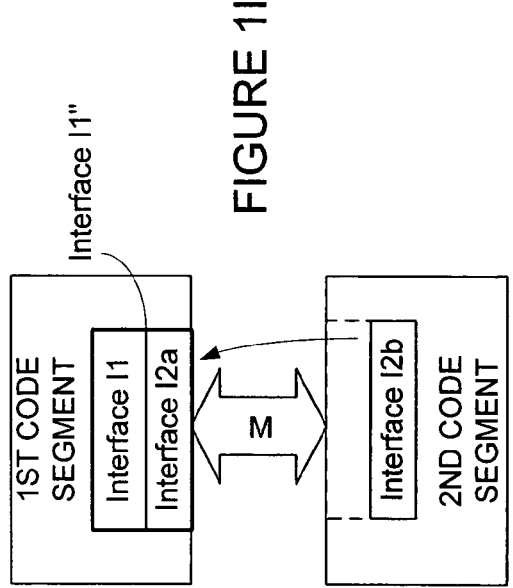

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
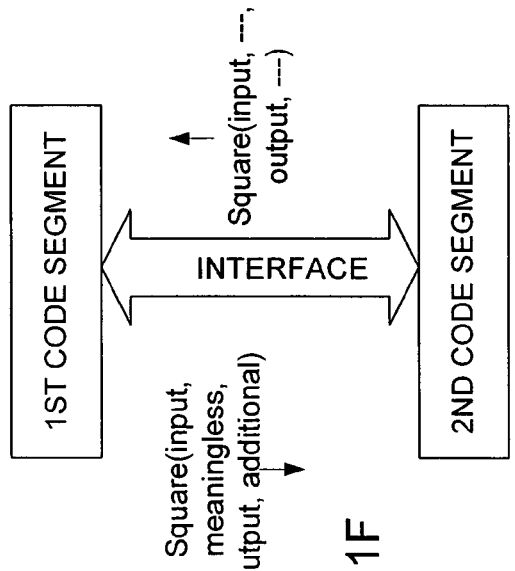
Figure 1I:
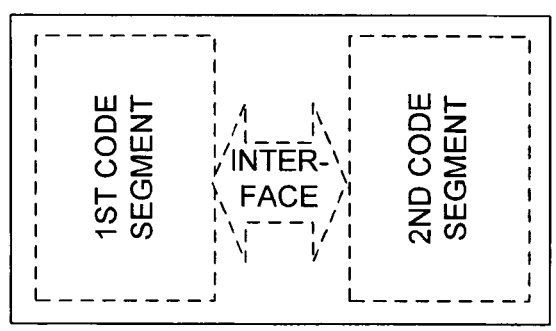

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into 12a and 12b, and interface portion 12a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
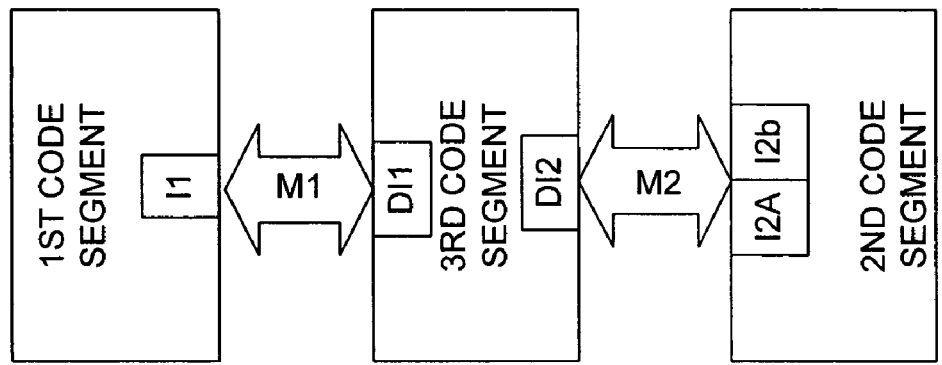
Figure 1J:
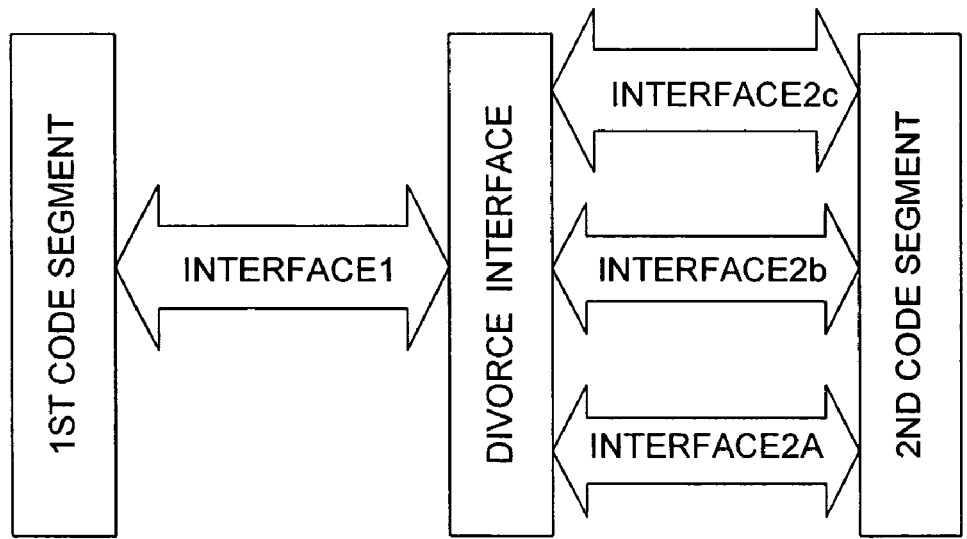

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces 12a and 12b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
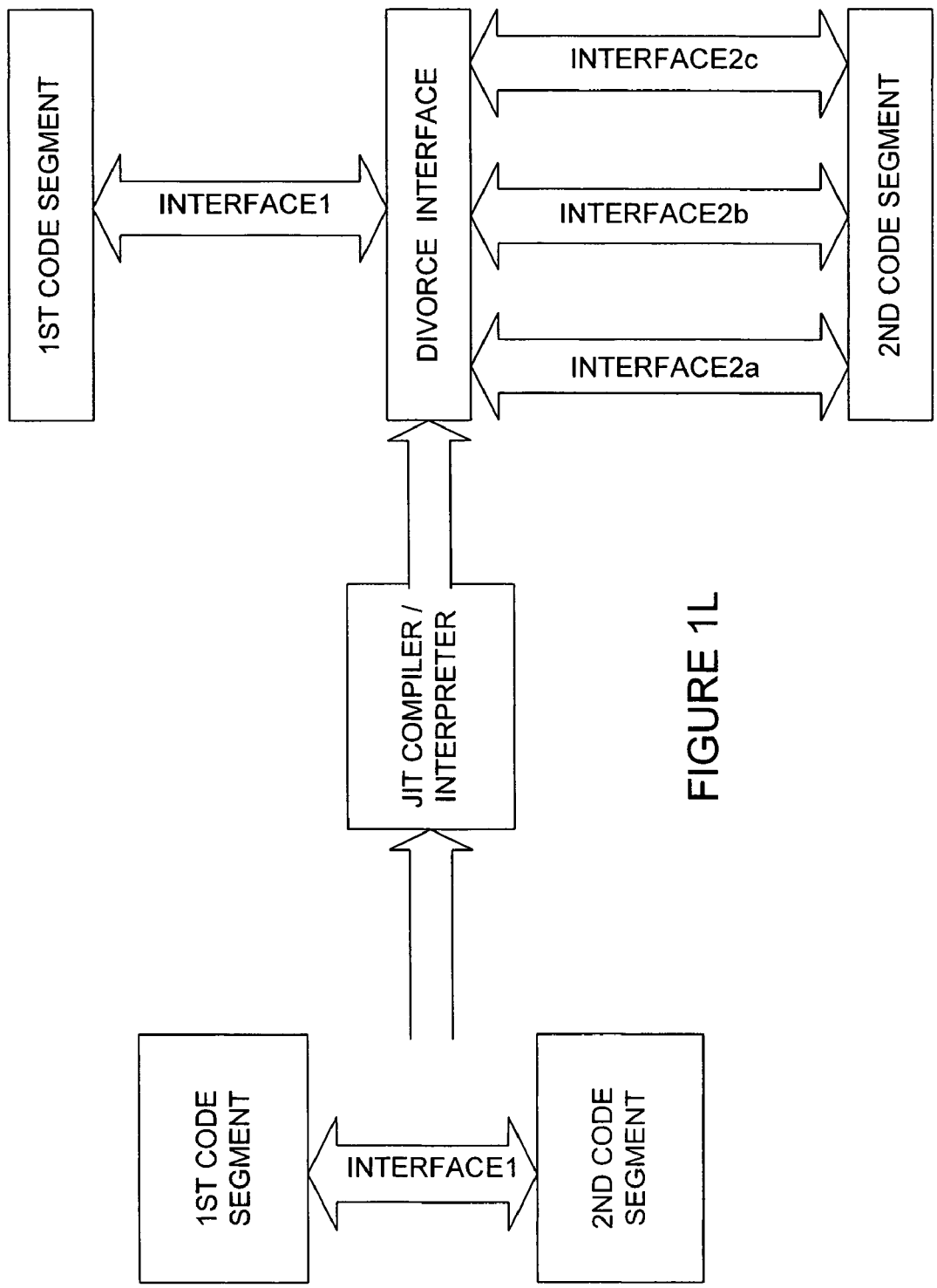
Figure 1M:
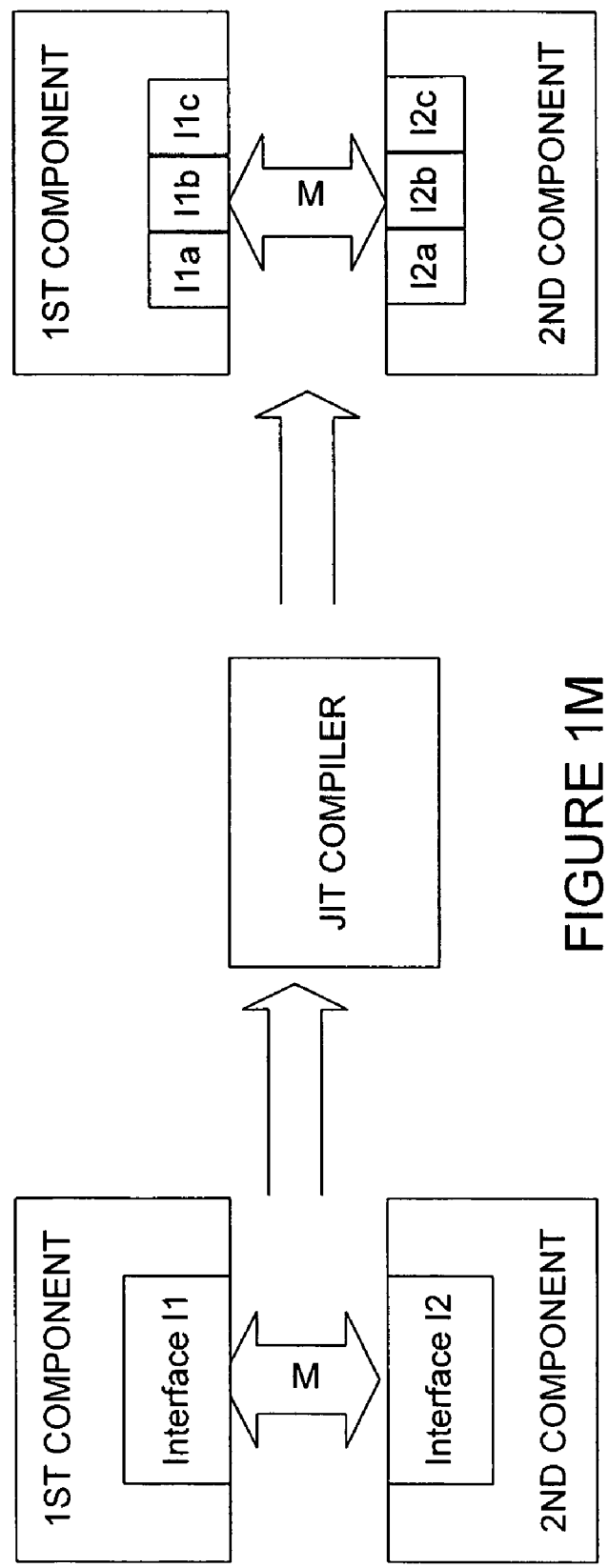

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
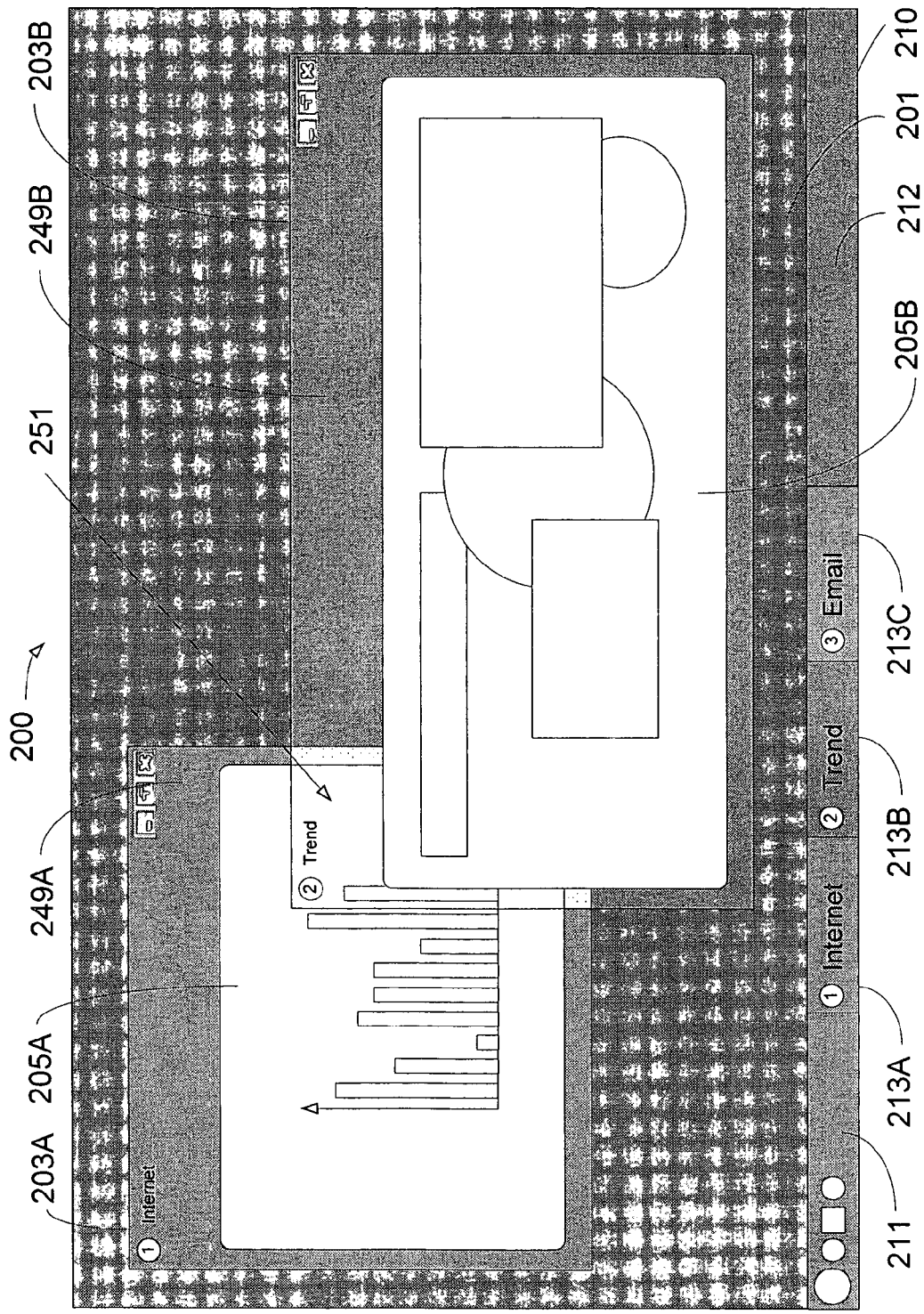
FIG. 2 illustrates an example of an application window scenario including application windows with defined color values and level of opacity values in accordance with at least one aspect of the present invention.

FIG. 2 illustrates an example of an application window scenario including application windows with defined color values and level of opacity values in accordance with at least one aspect of the present invention. An attribute of an operating environment in accordance with aspects of the present invention includes a glass appearance window frame that may be common to all application windows, property sheets, dialogs and other user interface (UI) elements including a taskbar, a sidebar, and a start menu. The properties of the glass appearance window frame include being partially transparent, static and/or dynamic highlights, and any visible region behind the glass appearance being blurred.

The composition of a glass appearance window frame is achieved in part through a supplied bitmap image plus the programmatically generated blur region behind the glass appearance window frame. As shown in the operating environment 200 of FIG. 2, application windows 203A and 203B are shown within a desktop space 201. As described herein, the Figures illustrate examples of the present invention with respect to application windows. Although not shown in the Figures, it should be understood by those skilled in the art that other user interface (UI) elements utilizing a glass appearance window frame may include one or more aspects of the present invention. For example, aspects of the present invention may be used for property sheets, dialog boxes, a taskbar, a sidebar, and/or a start menu that utilize a glass appearance window frame.

As shown in FIG. 2, desktop space 201 is an area or region of a display that allows for the display of application windows corresponding to application programs. Application windows 203A and 203B are used by an application program to display content 205A and 205B, respectively, to a user. As shown, application window 203A is partially obscured by application window 203B that is positioned in front. Application windows 203A and 203B are in a Z-order configuration in which application window 203B is higher in the Z-order than application window 203A.

As shown in FIG. 2, application window 203B at the top of Z-order is active and the underlying application window 203A is inactive. A taskbar 210 at the bottom of the display serves as a control region that indicates the application windows that are currently in use including application windows that are displayed in the desktop space 201 as well as any minimized application windows. The taskbar 210 is a specific implementation of an on-screen window remote control used to list and enable manipulation of application windows, such as activating, moving, hiding, and minimizing. Taskbar 210 is shown to include regions 211 and 212 that are separated by taskbar buttons 213A-213C that represent application windows.

Application window 203A is represented by taskbar button 213A, and application window 203B is represented by taskbar button 213B. A hidden application window is represented by taskbar button 213C. As shown in this example, application windows 203A and 203B are shown in the desktop space 201. The file name of the content 205A of application window 203A is shown along the title bar area of application window 203A. The file name of the content 205B of application window 203B is shown along the title bar area of application window 203B. Each file name may be generated by the application program operating the application window and/or may be customizable by a user. The same file name for each application window 203A and 203B is shown in the corresponding taskbar buttons 213A and 213B. Application windows 203A and 203B and taskbar buttons 213A and 213B include an application icon identifier to allow a user to identify the type of application program running the respective application window.

Application windows 203A and 203B are used by application programs to display content 205A and 205B, respectively, to a user. The application program associated with application window 203A may be a different application program or the same application program corresponding to application window 203B. Each of application windows 203A and 203B is independent of and external to the other application windows 203A and 203B. As used herein, a first application window is external to a second application window when the first application window is not contained within the second application window and the second application window is not contained within the first application window. It should be understood that a first window is not contained in a second application window if the two application windows merely overlap.

Application windows 203A and 203B are shown to include a glass appearance window frame 249A and 249B, respectively. The glass appearance window frames 249A and 249B of application windows 203A and 203B may be configured to only be shown around the top of the application windows 203A and 203B and/or one or more other sides of the application windows 203A and 203B. As used herein, a glass appearance window frame representation includes a window frame of an application window itself, an application window tile in a predefined control region, a taskbar, a sidebar, and a start menu. It should be understood by those skilled in the art that although the illustrative examples described herein refer to application windows and application window tiles, the present invention is not so limited to those examples. One or more aspects of the present invention may be used with respect to a start menu, a sidebar, a taskbar, a property sheets, and dialog boxes. The taskbar 210 in FIG. 2 is also shown in a configuration with a glass appearance window frame.

The glass appearance window frames 249A and 249B of application windows 203A and 203B and the taskbar 210 are shown being represented by a defined color value and level of opacity value. In a user experience and the rendering of the glass appearance window frame, a visual and behavioral element that effectively mimics colorization, e.g., color tinting, of a glass window is introduced. The configuration of the colorization of the glass appearance window frame may be dynamic, changing whether over time or in response to some event. In order to provide greater personalization over the color employed in the operating environment 200, aspects of the invention describes the ability to programmatically introduce a user-defined and/or system-defined color value and level of opacity value into the composition of a glass appearance window frame. Specifically, the color value and the level of opacity value are introduced into the programmatically-described blur region behind the glass appearance window frame. The resulting appearance is that a color tinting has been applied to the glass appearance window frame. Together, the transparency, underlying blur, reflective highlight, and colorization suggest the properties associated with real-world glass.

The colorization of the application windows 203A and 203B may be part of the composition of common glass appearance window frames and may be a combination of a pre-defined bitmap image and a programmatically-described blur region behind the glass appearance window frame as described below. In accordance with at least one aspect of the present invention, the colorization of the glass appearance window frames change dynamically.

As described above, application window 203A is partially obscured by application window 203B that is positioned in front since application 203B is higher in the Z-order than application window 203A. As shown in FIG. 2, region 251 shows how the glass appearance window frame 249B of application window 203B is transparent in appearance while the content portion 205B of application window 203B is not transparent. Content portion 205B completely covers any underlying image. The visual attributes of transparency, highlights, and underlying blur associated with glass appearance window frame 249B surrounding application window 203B may be applied to other system elements. For example, FIG. 2 illustrates these same visual attributes in regions 211 and 212 and the buttons 213A-21C in the taskbar 210.

In accordance with at least one aspect of the invention, color values may be described using red, green and blue (RGB) component values, ranging from 0-255, and the level of opacity, e.g., alpha, may be described as a percentage value, ranging from 0%-100%. A percentage value of 0% may correspond to no color into a glass appearance window frame whereas a percentage value of 100% may correspond to a fully opaque color. Together, these values may be provided as an aRGB value for application to a blur region behind a glass appearance window frame to create a visual appearance of colorization of the glass appearance window frame. It should be understood by those skilled in the art that any other type of color management system may be employed, such as sRGB, CMYK, and CIElab, and that the present invention is not so limited to any one type of color management system. Further, any of a number of other manners for representing variations in color and/or opacity levels may be employed. Still further, other techniques for gradient colorization may be employed where one portion of a glass appearance window frame is one color and/or level of opacity while a different portion is a second color and/or level of opacity.

Figure 3:
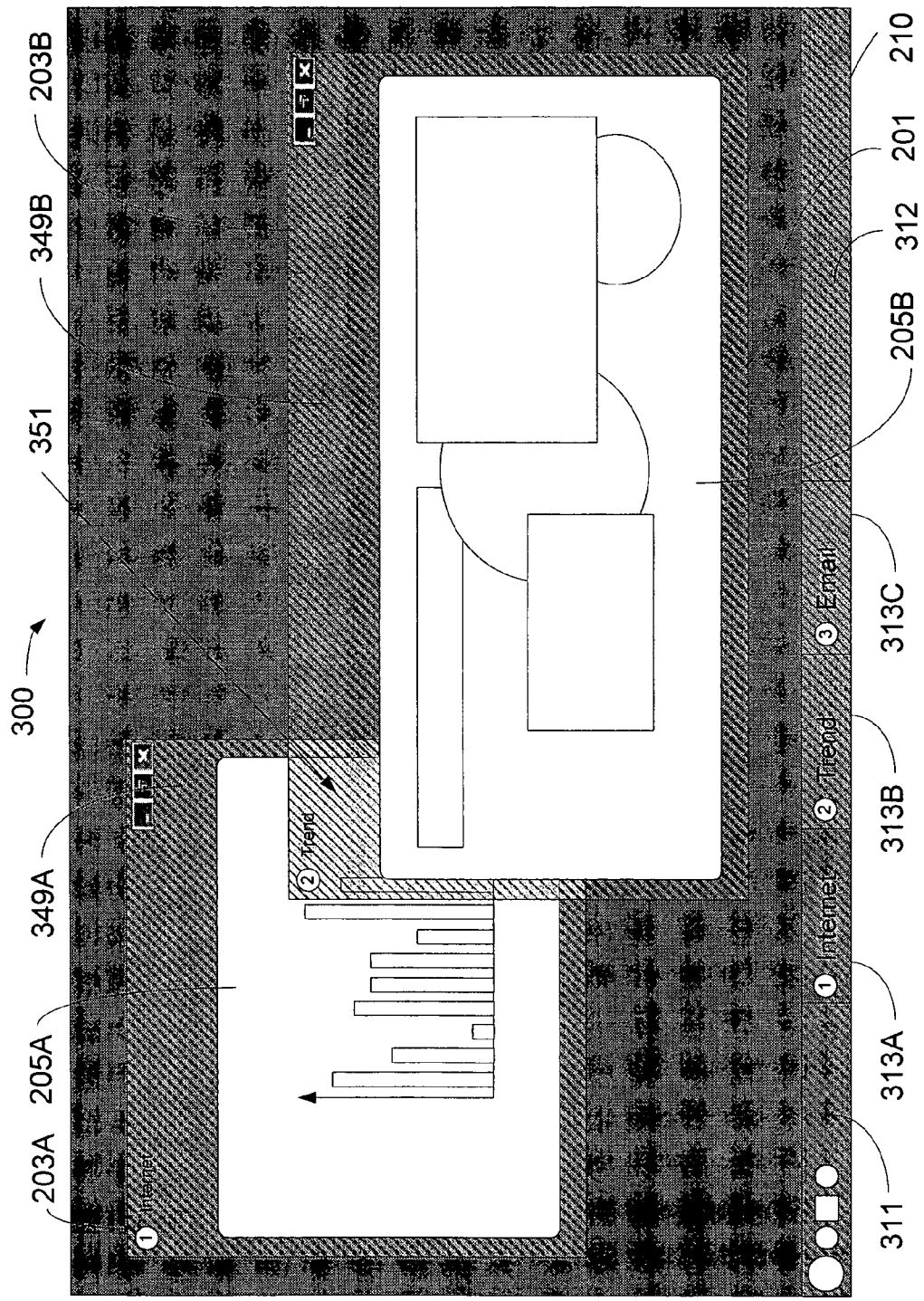
FIG. 3 illustrates another example of an application window scenario including application windows with defined color values and level of opacity values in accordance with at least one aspect of the present invention.

FIG. 3 illustrates another example of an application window scenario including application windows with defined color values and level of opacity values in accordance with at least one aspect of the present invention. FIG. 3 illustrates an operating environment 300 in which the glass appearance window frames 249A and 249 B of application windows 203A and 203B and the regions 211 and 212, and taskbar buttons 213A-213C from FIG. 2 have been changed.

In FIG. 3, application windows 203A and 203B have glass appearance window frames 349A and 349B, respectively, and are represented by taskbar buttons 313A and 313B respectively. A hidden, e.g., minimized, application window is represented by taskbar button 313C. As shown, the glass appearance window frames 349A and 349B of the application windows 203B and 203B and the regions 311 and 312 and taskbar buttons 313A-313C in the taskbar 210 are shown with a visual appearance represented by a slanted line. The visual appearance is representative of a glass appearance window frame with a different applied color value and level of opacity value applied to the blur region behind the glass appearance window frame of the application window.

As shown in FIG. 3, region 351 shows how the glass appearance window frames 349A and 349B of application window 203A and 203B are transparent. In this example, the glass appearance window frames 349A and 349B of application windows 203A and 203B may have a different color value and/or a different level of opacity value being applied in comparison to the values applied in FIG. 2. As described below, the change in colorization, e.g., color value and/or level of opacity value, from FIG. 2 to FIG. 3 may be defined by a user and/or a system. In addition, the color values and/or level of opacity values between glass appearance window frames may be application specific. For example, all glass appearance window frames for an email application may have a different color value and/or level of opacity value than glass appearance window frames for a web browser application or a word processing application. It should be understood by those skilled in the art that the number of application windows shown is merely illustrative and that any number of application windows may be open at a time including those presented on the desktop space 201.

Figure 4:
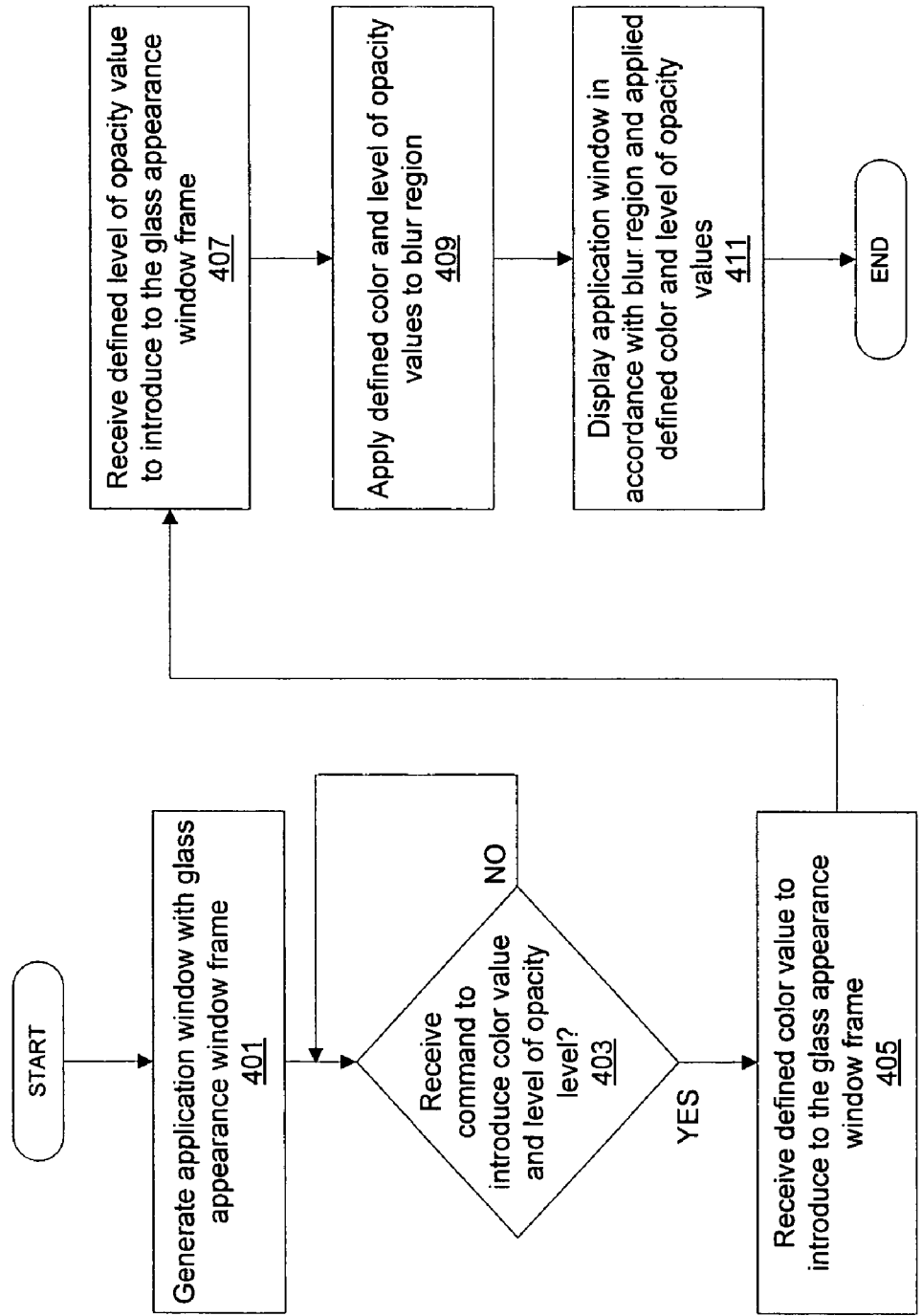
FIG. 4 is a flowchart of an illustrative example of a method for displaying an application window with a glass appearance window frame in accordance with at least one aspect of the present invention.

FIG. 4 is a flowchart of an illustrative example of a method for displaying an application window with a glass appearance window frame in accordance with at least one aspect of the present invention. Aspects of the present invention include a method for programmatically defining and introducing a defined color value and level of opacity value into the composition of glass appearance window frames employed in a UI environment which results in the visual appearance of tinted glass. The process starts and at step 401 an application window with a glass appearance window frame for display within a desktop space is generated. At step 403, a determination is made as to whether a command is received to introduce a color value and a level of opacity value to the glass appearance window frame. If no, the process returns to step 403. If a command is received to introduce a color value and a level of opacity value, the process moves to step 405.

At step 405, the defined color value to introduce to the glass appearance window frame is received. Moving to step 407, the defined level of opacity values to introduce to the glass appearance window frame is received. At step 409, the defined color value and level of opacity value are applied to the blur region behind the glass appearance window frame. Finally, at step 411, the application window is displayed with a glass appearance window frame in accordance with the blur region and the applied defined color and level of opacity values. For example, application window 203A and/or 203B in FIGS. 2 and/or 3 may be the result from step 411.

It should be understood by those skilled in the art that the process described in FIG. 4 may be applied to other glass appearance window frames, such as those in a task bar 210 and/or associated with a start menu, a sidebar, a property sheet, or a dialog box. Further, it should be understood that fewer than all of the steps provided may be employed for different embodiments of the present invention. For example, aspects of the present invention include a change to the color of a glass appearance window frame without a change in opacity level. Still further, it should be understood that the illustrative example described with reference to FIG. 4 is but one example for colorization utilizing a blur region behind a glass appearance window frame. It should be understood by those skilled in the at that the present invention is not so limited to implementation within a blur region behind a glass appearance window frame.

Figure 5A:
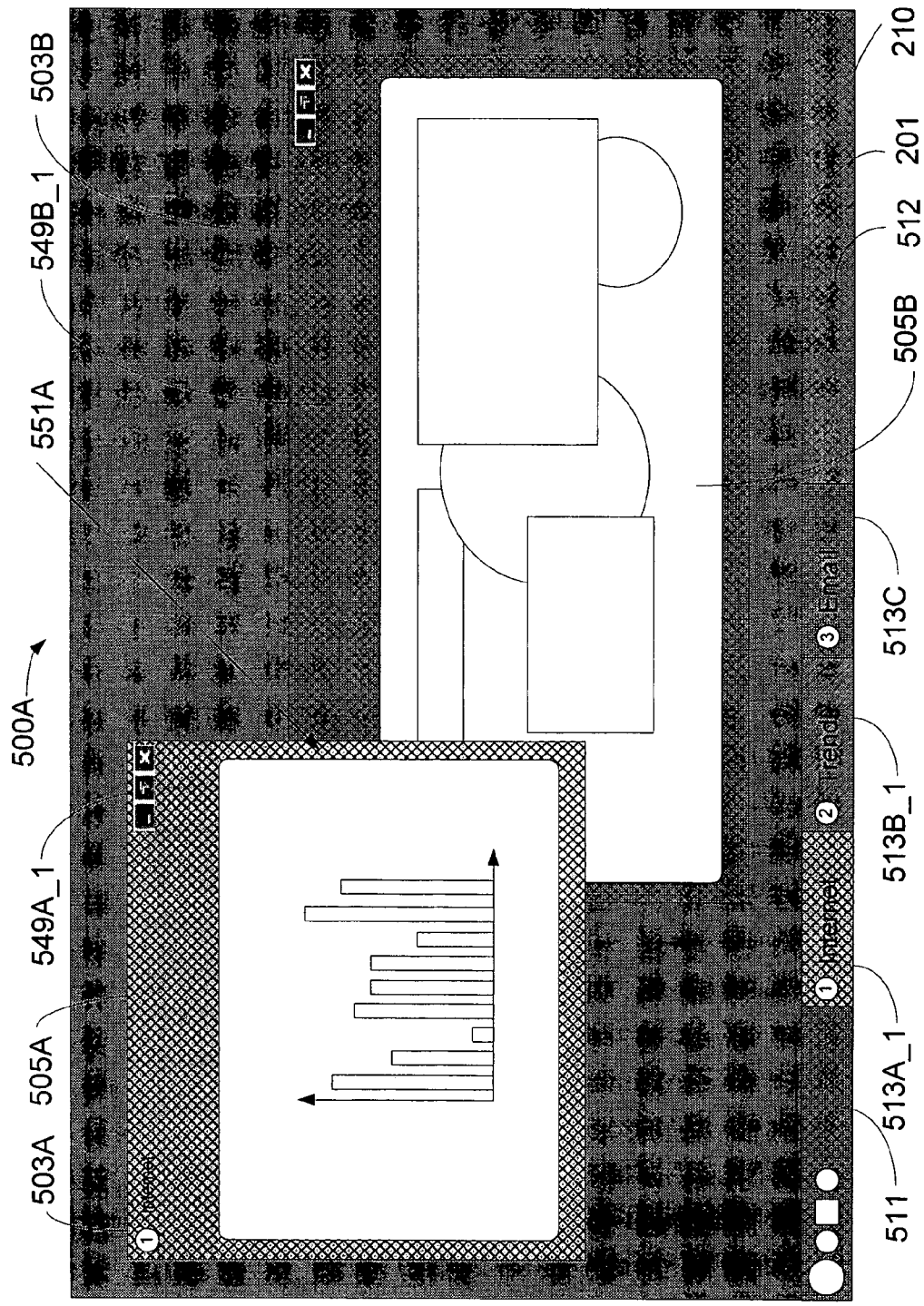
FIGS. 5A-5B illustrate an example of an application window scenario including active and inactive application windows with defined color values and level of opacity values in first and second states respectively in accordance with at least one aspect of the present invention.
Figure 5B:
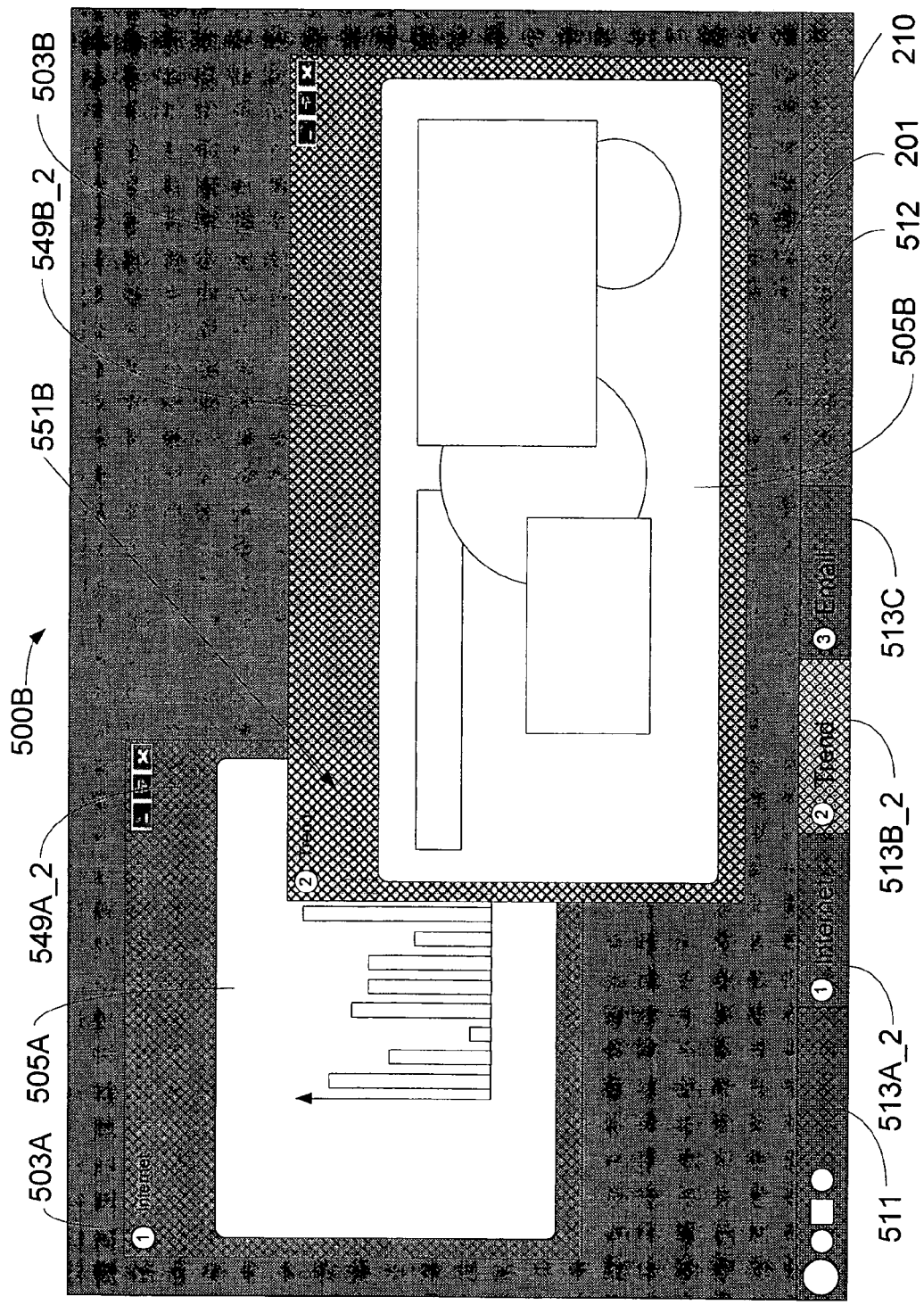

FIGS. 5A-5B illustrate an example of an application window scenario including active and inactive application windows with defined color values and level of opacity values in first 500A and second 500B states respectively in accordance with at least one aspect of the present invention. FIG. 5A illustrates an example 500A of when application window 503A is in an active visual state and application window 503B is in an inactive visual state. The difference in the visual states may be that the colorization of the glass appearance window frame of application window 503A is more opaque than that of the glass appearance window frame of application window 503B. In another embodiment, the difference in the visual states may be that the colorization of the glass appearance window frame of application window 503A is a different color and/or combination of a different color and opaqueness than that of the glass appearance window frame of application window 503B. It should be understood that an active application window is one that is currently in use by a user while an inactive application window must be accessed in some manner in order to become active. The application program associated with application window 503A may be a different application program or the same application program corresponding to application window 503B. Each of application windows 503A-503B is independent of and external to the other application window 503A-503B. As used herein, a first application window is external to a second application window when the first application window is not contained within the second application window and the second application window is not contained within the first application window. It should be understood that a first window is not contained in a second application window if the two application windows merely overlap.

Example 500A in FIG. 5A illustrates an active state colorization of a first application window 503A and an inactive state colorization of a second application window 503B. In this example, the colorization of the glass appearance window frame 549A_1 of application window 503A may be more opaque than the colorization of the glass appearance window frame 549B_1 of application window 503B. Application windows 503A and 503B are represented by taskbar buttons 513A and 513B respectively. A hidden, e.g., minimized, application window is represented by taskbar button 513C. As application window 503A is the active application window, application window 503A is at the top of the Z-order of the application windows within the desktop space 201. As such, the content 505A of application window 503A is not transparent with respect to underlying content such as shown in portion 551A. The content 505B of application window 503B is only exposed in areas not covered by application window 503A and is partially exposed in areas covered by the glass appearance window frame 549A_1 of application window 503A based upon the level of opacity of the glass appearance window frame 549A_1.

As shown, the glass appearance window frame 549B_1 of application window 503B and the regions 511 and 512 and taskbar buttons 513B-513C in the taskbar 210 are shown with a different visual appearance than the glass appearance window frame 549A_1 of application window 503A and taskbar button 513A. Because application window 503A is in an active state colorization, its glass appearance window frame 549A_1 and corresponding taskbar button 513A are shown in a different colorization. As previously stated, the difference in colorization may be a difference in opaqueness and/or color of the glass appearance window frame.

Upon an occurrence of when application window 503B becomes the active window, application window 503A automatically becomes inactive. Example 500B in FIG. 5B illustrates an end transition from FIG. 5A with an inactive state colorization of the first application window 503A and an active state colorization of the second application window 503B. In this example, since application window 503B is now the active application window, the glass appearance window frame 549A_2 of application window 503A may be less opaque than the glass appearance window frame 549B_2 of application window 503B. Such an occurrence of an event may occur when a user clicks on application window 503B with an input device.

As application window 503B is now the active application window, application window 503B is at the top of the Z-order of the application windows within the desktop space 201. As such, the content 505B of application window 503B is not transparent with respect to underlying content such as shown in portion 551B. The content 505A of application window 503A is only exposed in areas not covered by application window 503B and is partially exposed in areas covered by the glass appearance window frame 549B_2 of application window 503B based upon the level of opacity of the glass appearance window frame 549B_2.

As shown in FIG. 5B, the glass appearance window frame 549A_2 of application window 503A and the regions 511 and 512 and taskbar buttons 513A and 513C in the taskbar 210 are shown with a different visual appearance than the glass appearance window frame 549B_2 of application window 503B and taskbar button 513B. Because application window 503B is now in an active state colorization, its glass appearance window frame 549B_2 and corresponding taskbar button 513B are shown in a different colorization. As previously stated, the difference in colorization may be a difference in opaqueness and/or color of the glass appearance window frame.

FIG. 6 is a flowchart of an illustrative example of a method for displaying application windows with glass appearance window frames based on whether they are in an active or inactive state in accordance with at least one aspect of the present invention. The process starts at step 601 where a command is received to display a first application window. At step 603, a defined active color and level of opacity is applied to the glass appearance window frame of the first application window. Moving to step 605, the first application window is displayed in accordance with applied defined active color and level of opacity for the glass appearance window frame of the first application window. At step 607, a command is received to display a second application window. Proceeding to step 609, a defined active color and level of opacity is applied to the glass appearance window frame of the second application window. Then, at step 611, the second application window is displayed in accordance with the applied defined active color and level of opacity for the glass appearance window frame of the second application window.

Proceeding to step 613, a defined inactive color and level of opacity is applied to the glass appearance window frame of the first application window, and, at step 615, the first application window is displayed in accordance with the applied defined inactive color and level of opacity for the glass appearance window frame of the first application window. At step 617, a determination is made as to whether a command has been received to change the first application window to an active state status. If not, the process ends. If a command has been received in step 617, the process moves to step 619.

At step 619, a defined active color and level of opacity is applied to the glass appearance window frame of the first application window. Moving to step 621, the first application window is displayed in accordance with the applied defined active color and level of opacity for the glass appearance window frame of the first application window. At step 623, a defined inactive color and level of opacity is applied to the glass appearance window frame of the second application window, and, at step 625, the second application window is displayed in accordance with the applied defined inactive color and level of opacity for the glass appearance window frame of the second application window before the process ends. Although not shown within these Figures, it should be understood by those skilled in the art that more than two application windows may be configured within a desktop space and that the present invention is not so limited to one or two application windows.

FIG. 7 is flowchart of an illustrative example of another method for displaying application windows with glass appearance window frames in accordance with at least one aspect of the present invention. The method described in FIG. 7 is but one example for a system to determine the colorization to apply to application windows. It should be understood by those skilled in the art that the present invention is not so limited to the examples described herein. The process starts and at step 701, a command is received to display a first application window. At step 703, a defined color and level of opacity is applied to the glass appearance window frame of the first application window. Moving to step 705, the first application window is displayed in accordance with the applied defined color and level of opacity for the glass appearance window frame of the first application window. At step 707, a command is received to display a second application window.

Proceeding to step 709, a determination is made as to whether the defined color value and level of opacity value for the glass appearance window frame of the second application window is different from the defined color value and level of opacity value of the glass appearance window frame of the first application window. For example, an operating system may have a default instruction to apply the same color value and level of opacity value to any window that is opened and displayed within a desktop space. Alternatively, an operating system may have a default instruction to apply a different color and level of opacity to new windows that are opened and displayed within a desktop space. For example, the choice of color values and/or level of opacity values may be user specific and/or implemented according to the application utilizing the glass appearance window frame. In such a case, all glass appearance window frames for an email application may be displayed in accordance with a first color value and/or level of opacity value while all glass appearance window frames for a web browser application or a word processing application may be displayed in accordance with a second color value and/or level of opacity value.

Returning to FIG. 7, if the defined color value and level of opacity value for a second application window is different from the first application window, the process moves to step 711 where a different color and level of opacity, in comparison to the first application window, is applied to the glass appearance window frame of the second application window. Moving to step 713, the second application window is displayed in accordance with the applied different color and level of opacity for the glass appearance window frame of the second application window before the process ends. Alternatively, if the defined color value and level of opacity value for a second application window is not different from the first application window, the process moves to step 715 where the same color and level of opacity, in comparison to the first application window, is applied to the glass appearance window frame of the second application window. At step 717, the second application window is displayed in accordance with the applied same color and level of opacity for the glass appearance window frame of the second application window before the process ends.

Figure 8:
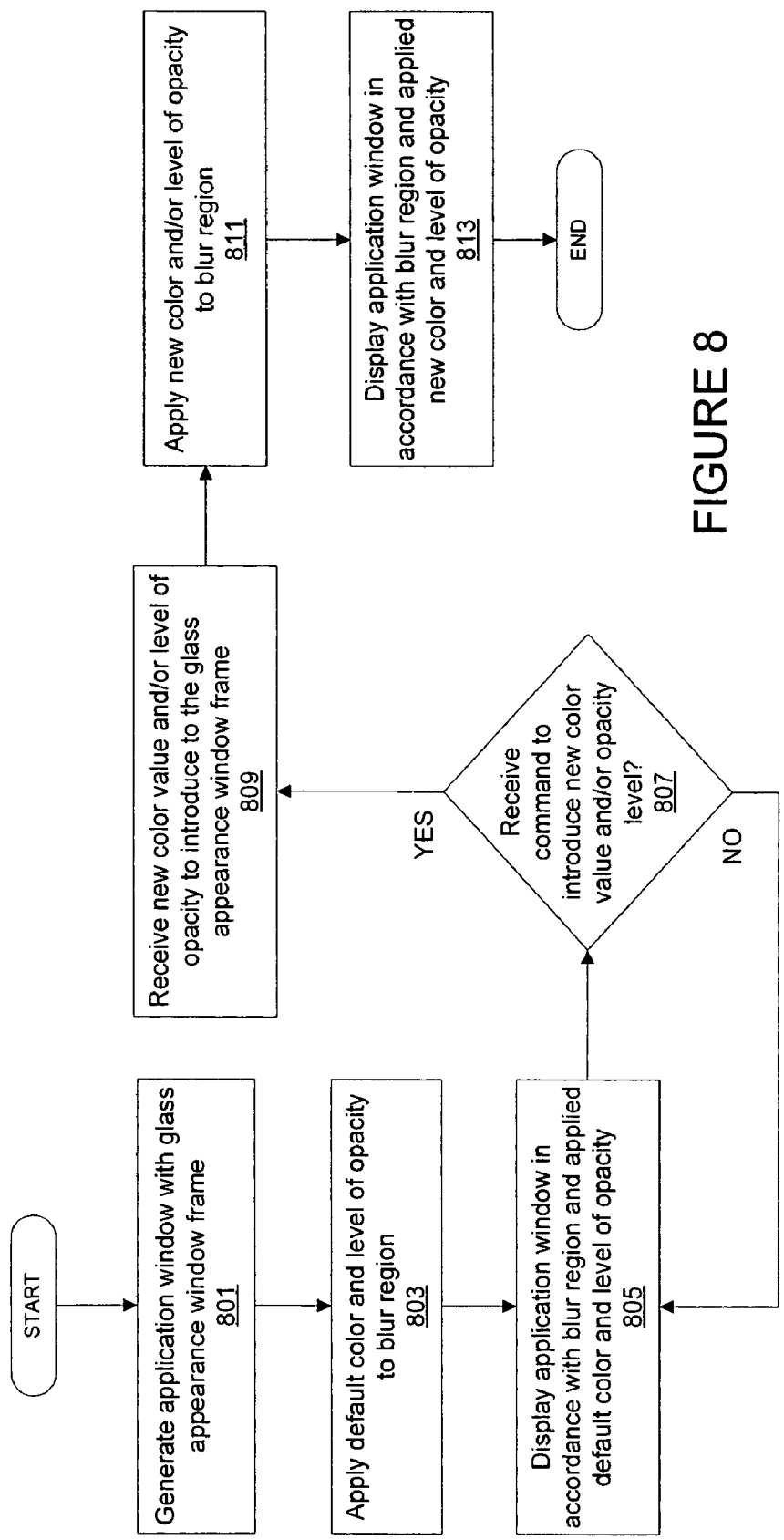
FIG. 8 is a flowchart of an illustrative example of a method for changing a default color value and level of opacity value of a window appearance frame of an application window in accordance with at least one aspect of the present invention.

FIG. 8 is a flowchart of an illustrative example of a method for changing a default color value and level of opacity value of a window appearance frame of an application window in accordance with at least one aspect of the present invention. As described herein, one or more aspects of the colorization of a glass appearance window frame may be configured by a computer system and/or by a user. A default configuration may be established and/or may exist for different operating system environment themes. A user may then be permitted to change one or more aspects of the default configuration.

Starting at step 801, an application window with a glass appearance window frame is generated. Proceeding to step 803, a default color value and level of opacity value is applied to the blur region behind the glass appearance window frame. At step 805, the application window is displayed in accordance with the blur region and applied default color value and level of opacity value. At step 807, a determination is made as to whether a command has been received to introduce a new color value and/or level of opacity value, e.g., to change the default configuration. If not, the process returns to step 805. If a command is received in step 807, the process moves to step 809

At step 809, a new color value and/or level of opacity value to introduce to the glass appearance window frame is received. For example, a user may decide to change default configuration for the level of opacity of application windows. Proceeding to step 811, the new color value and/or level of opacity value is applied to the blur region behind the glass appearance window frame. Finally at step 813, the application window is displayed in accordance with the blur region and applied new color value and/or level of opacity value.

It should be understood by those skilled in the art that other variables such as stacked windows, obscured windows, and/or overlapping windows may also be taken into account when rendering colorization of a glass appearance window frame for an application window. Those skilled in the art would appreciate these variables and all the possible configurations that may exist.

With respect to an application programming interface (API), various aspects of the present invention may be performed by an API. For example, public APIs may interface with an operating system to allow the operating system to provide the various features of the present invention. In one embodiment, a software architecture stored on one or more computer-readable media for processing data representative of a change in the colorization of a glass appearance window frame of an application window may include a component configured to change a color value and/or level of opacity value associated with a glass appearance window frame of an application window and an application program interface to access the component. An API may receive a request to change the color value and/or level of opacity value associated with a glass appearance window frame of an application window, access the necessary function(s) to perform the operation, and then send the results back to an operating system. The operating system may use the data provided from the API to perform the various features of the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A computer readable medium having computer-executable instructions stored thereon for performing a method for applying a color and opacity to a glass appearance window frame when executed by a computer, the method comprising the steps of:
   determining a defined color value and a defined level of opacity value to apply to a glass appearance window frame, wherein the glass appearance window frame is associated with an application window, and wherein the defined color value and the defined level of opacity value are based upon user-defined entries;
   displaying the glass appearance window frame in accordance with the defined color value and the defined level of opacity value.

2. The computer readable medium of claim 1, wherein the step of determining includes steps of:
   receiving a command to apply the defined color value and the defined level of opacity value to the glass appearance window frame; and
   applying the defined color value and level of opacity value to a blur region behind the glass appearance window frame.

3. The computer readable medium of claim 1, further comprising receiving a command to change a color value and a level of opacity value of the glass appearance window frame to the defined color value and defined level of opacity.

4. The computer readable medium of claim 3, further comprising determining whether to change the color value and the level of opacity value of the glass appearance window frame to the defined color value and the defined level of opacity value.

5. The computer readable medium of claim 1, further comprising changing an active status of the application window associated with the glass appearance window frame to an inactive status, wherein the application window is a first application window, and wherein the glass appearance window frame corresponds to the first application window.

6. The computer readable medium of claim 5, further comprising:
   receiving a request to display a second application window;
   determining an active status color value and an active status level of opacity value to apply to a glass appearance window frame of the second application window; and
   displaying the glass appearance window frame of the second application window in accordance with the active status color value and the active status level of opacity value.

7. The computer readable medium of claim 6, further comprising displaying the glass appearance window frame of the first application window in accordance with an inactive status color value and an inactive status level of opacity value.

8. The computer readable medium of claim 7, wherein the active status level of opacity value corresponds to a more opaque glass appearance window frame than the inactive status level of opacity value.

9. The computer readable medium of claim 1, further comprising displaying a glass appearance window frame of a taskbar button in accordance with the defined color value and the defined level of opacity value.

10. The computer readable medium of claim 1, further comprising:
    receiving a request to display the application window, wherein the application window is a first application window, and wherein the glass appearance window frame corresponds to the first application window;
    receiving a request to display a second application window with a corresponding second glass appearance window frame;
    determining whether to apply to the second glass appearance window frame a different color value and a different level of opacity value; and
    displaying the second glass appearance window frame of the second application window in accordance with the different color value and the different level of opacity value.

11. The computer readable medium of claim 1, wherein the application window is a first application window, and wherein the glass appearance window frame is associated with the first application window, the method further comprising:
    receiving a request to display a second application window;
    determining an application specific color value and an application specific level of opacity value to apply to a second glass appearance window frame of the second application window; and
    displaying the second glass appearance window frame of the second application window in accordance with the application specific color value and the application specific level of opacity value,
    wherein the defined color value and the defined level of opacity value are defined by a first application corresponding to the first application window and the application specific color value and the application specific level of opacity value are defined by a second application corresponding to the second application window.

12. A system for transferring computer-executable instructions to one or more computers, the system comprising a computer readable medium having the computer-executable instructions stored thereon for performing a method for applying a color and opacity to a glass appearance window frame when executed by the one or more computers, the method comprising steps of:
    determining at least one of a defined color value and a defined level of opacity value to apply to a glass appearance window frame, wherein the glass appearance window frame is associated with an application window, and wherein the defined color value and the defined level of opacity value are based a type of application associated with the application window; and
    changing a glass appearance window frame in accordance with the at least one of defined color value and the defined level of opacity value.

13. The system of claim 12, further comprising a second computer configured to transmit the computer readable instructions to the one or more computers.

14. The system of claim 13, wherein the computer-executable instructions further comprise steps of:
    receiving a command to apply the at least one of the defined color value and the defined level of opacity value to the glass appearance window frame; and
    applying the at least one of the defined color value and level of opacity value to a blur region behind the glass appearance window frame.

15. The system of claim 12, wherein the at least one of the defined color value and the defined level of opacity value are based upon user-defined entries.

16. The system of claim 12, wherein the computer-executable instructions further comprise a step of changing an active status of a first application window associated with the glass appearance window frame to an inactive status.

17. One or more computer-readable media having computer-executable instructions embodied thereon that, when executed, perform a method for applying a color and opacity to a glass appearance window frame associated with an application window, the method comprising:

receiving a request to display a first application window, wherein the glass appearance window frame corresponds to the first application window;

determining a defined color value and a defined level of opacity value to apply to the glass appearance window frame of the first application window;

displaying the glass appearance window frame of the first application window in accordance with the defined color value and the defined level of opacity value;

receiving a request to display a second application window with a corresponding second glass appearance window frame;

determining whether to apply to the second glass appearance window frame a different color value and a different level of opacity value, wherein the determination is based on at least one of a type of application associated with the second application window, a user-defined entry of the different color value and different level of opacity value, a time of display of the second application window in comparison to the time of display of the first application window, and whether the first application window is in an active or inactive state; and displaying the second glass appearance window frame of the second application window in accordance with the different color value and the different level of opacity value.

* * * * *